United States Patent
Gupta et al.

(10) Patent No.: US 10,462,788 B2
(45) Date of Patent: Oct. 29, 2019

(54) METHOD AND APPARATUS FOR OPERATING A DEVICE ON A LICENSED SPECTRUM AND AN UNLICENSED SPECTRUM

(71) Applicant: Motorola Mobility LLC, Chicago, IL (US)

(72) Inventors: Ranjeet Gupta, Naperville, IL (US); James Van Bosch, Crystal Lake, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/269,874

(22) Filed: Sep. 19, 2016

(65) Prior Publication Data

US 2018/0084547 A1   Mar. 22, 2018

(51) Int. Cl.
*H04W 72/04* (2009.01)
*H04J 11/00* (2006.01)
(Continued)

(52) U.S. Cl.
CPC ..... *H04W 72/0453* (2013.01); *H04J 11/0083* (2013.01); *H04W 40/005* (2013.01);
(Continued)

(58) Field of Classification Search
CPC .......................... H04W 72/0453; H04W 16/14
(Continued)

(56) References Cited

U.S. PATENT DOCUMENTS 9,432,840 B2   8/2016   Traynor et al.
9,510,133 B2   11/2016  Gupta et al.
(Continued)

FOREIGN PATENT DOCUMENTS

WO   WO2015180075 A1   12/2015
WO   WO2016012578 A1   1/2016
(Continued)

OTHER PUBLICATIONS

Cundy, Search Report under Section 17, GB Application No. GB1717533.2, Intellectual Property Office of the United Kingdom, dated Apr. 20, 2018.
(Continued)

*Primary Examiner* — Chuck Huynh
(74) *Attorney, Agent, or Firm* — Loppnow & Chapa; Matthew C. Loppnow (57) ABSTRACT

A method and apparatus operate a device on a licensed spectrum and an unlicensed spectrum. The device can operate on a Wireless Wide Area Network (WWAN) channel using a WWAN base station using a WWAN Radio Access Technology (RAT). At least one Wireless Local Area Network (WLAN) base station that uses the WWAN RAT operating on a WLAN frequency can be detected. WLAN frequencies can be scanned. Information including information about the at least one WLAN base station using the WWAN RAT, the results of scanning the WLAN frequencies, and device specific information to a base station can be sent. A WLAN channel of the WLAN frequencies with a WLAN base station of the at least one WLAN base station using the WWAN RAT can be communicated on in response to sending the information.

19 Claims, 8 Drawing Sheets

(51) Int. Cl.
*H04W 40/00* (2009.01)
*H04L 12/28* (2006.01)
*H04W 84/12* (2009.01)
*H04W 88/06* (2009.01)

(52) U.S. Cl.
CPC ......... *H04L 12/2854* (2013.01); *H04W 84/12* (2013.01); *H04W 88/06* (2013.01)

(58) Field of Classification Search
USPC ........................................................ 455/451
See application file for complete search history.

(56) References Cited

U.S. PATENT DOCUMENTS

| | | | |
|---|---|---|---|
| 2004/0165563 A1* | 8/2004 | Hsu | H04W 48/18 370/338 |
| 2008/0096565 A1 | 4/2008 | Jin | |
| 2008/0101291 A1 | 5/2008 | Jiang | |
| 2010/0091731 A1 | 4/2010 | Kim | |
| 2013/0083783 A1 | 4/2013 | Gupta | |
| 2013/0203432 A1 | 8/2013 | Wang | |
| 2014/0043979 A1 | 2/2014 | Etemad et al. | |
| 2014/0133294 A1 | 5/2014 | Horn | |
| 2014/0185494 A1 | 7/2014 | Yang | |
| 2014/0274105 A1 | 9/2014 | Wang | |
| 2014/0354336 A1 | 12/2014 | Syllaios | |
| 2015/0029879 A1* | 1/2015 | Chou | H04W 4/70 370/252 |
| 2015/0103812 A1 | 4/2015 | Zhao et al. | |
| 2015/0117357 A1 | 4/2015 | Ozturk | |
| 2015/0223115 A1* | 8/2015 | Liang | H04W 28/085 370/235 |
| 2015/0365972 A1 | 12/2015 | Seok | |
| 2015/0382342 A1 | 12/2015 | Seok | |
| 2016/0165604 A1 | 6/2016 | Khawer et al. | |
| 2016/0277064 A1 | 9/2016 | Waxman | |
| 2017/0064745 A1 | 3/2017 | Kephart, Jr. et al. | |
| 2017/0311242 A1 | 10/2017 | Puranik | |
| 2018/0035438 A1 | 2/2018 | Pao et al. | |
| 2018/0242340 A1 | 8/2018 | Pu et al. | |

FOREIGN PATENT DOCUMENTS

| | | |
|---|---|---|
| WO | WO2016089801 A1 | 6/2016 |
| WO | WO2018052734 A1 | 3/2018 |

OTHER PUBLICATIONS

Wong, Notice of References Cited, PTO-892, U.S. Appl. No. 15/341,914, U.S. Patent and Trademark Office, filed Apr. 6, 2018.
Wong, PTO-892, Notice of References Cited, U.S. Appl. No. 15/341,900, U.S. Patent and Trademark Office, filed Aug. 3, 2018.
Wong, Notice of References Cited, U.S. Appl. No. 15/341,914, U.S. Patent and Trademark Office, filed Nov. 1, 2018.
Wong, Notice of References Cited, U.S. Appl. No. 15/341,900, U.S. Patent and Trademark Office, filed Dec. 13, 2018.
Shah, Notice of References Cited, U.S. Appl. No. 15/649,603, U.S. Patent and Trademark Office, filed Feb. 7, 2019.
Shah, Notice of References Cited, U.S. Appl. No. 15/649,603, U.S. Patent and Trademark Office, dated Jul. 25, 2019.

* cited by examiner

METHOD AND APPARATUS FOR OPERATING A DEVICE ON A LICENSED SPECTRUM AND AN UNLICENSED SPECTRUM

BACKGROUND

1. Field

The present disclosure is directed to a method and apparatus for operating a device on a licensed spectrum and an unlicensed spectrum. More particularly, the present disclosure is directed to operating a device on a licensed spectrum and an unlicensed spectrum using the same radio access technology.

2. Introduction

Presently, people use wireless communication devices to make calls, read electronic mail, surf the Internet, stream movies, download files, connect to other devices, and perform other wireless communication actions. Wireless communication devices include smartphones, cellular phones, laptop computers, tablet computers, connected home devices, televisions, set top boxes, and other wireless communication devices. Many of these devices can send and receive data on multiple radio access technologies, such as cellular, Long Term Evolution (LTE), IEEE 802.11 (Wi-Fi), IEEE 802.15.1 (Bluetooth), and other radio access technologies. LTE and other carrier grade services operate on licensed frequency bands. IEEE 802.11 services, such as for a Wireless Local Area Network (WLAN), operates on both 2.4 GHz and 5 GHz unlicensed frequency bands.

LTE Advanced is a radio access technology that has been proposed for providing carrier-grade wireless service in the 5 GHz, unlicensed band. Until today, IEEE 802.11 has been the most popular choice for radio access in the unlicensed space. However, wireless wide area network, such as LTE, technology, originally envisioned for cellular operation only in licensed bands, has significant performance gains over Wi-Fi when operating in the unlicensed band. Some advantages of LTE Advanced include better and more reliable links, better performance, better efficiency in Medium Access Control (MAC), better wireless communication device management, and excellent coverage. Unfortunately, because LTE Advanced operates in the same 5 MHz unlicensed band as IEEE 802.11, there are problems with conflicts between the two radio access technologies.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for operating a device on a licensed spectrum and an unlicensed spectrum. According to a possible embodiment, a device can operate on a Wireless Wide Area Network (WWAN) channel using a WWAN base station using a WWAN Radio Access Technology (RAT). At least one Wireless Local Area Network (WLAN) base station that uses the WWAN RAT operating on a WLAN frequency can be detected. WLAN frequencies can be scanned. Information including information about the at least one WLAN base station using the WWAN RAT, the results of scanning the WLAN frequencies, and device specific information to a base station can be sent. A WLAN channel of the WLAN frequencies with a WLAN base station of the at least one WLAN base station using the WWAN RAT can be communicated on in response to sending the information.

Figure 1:
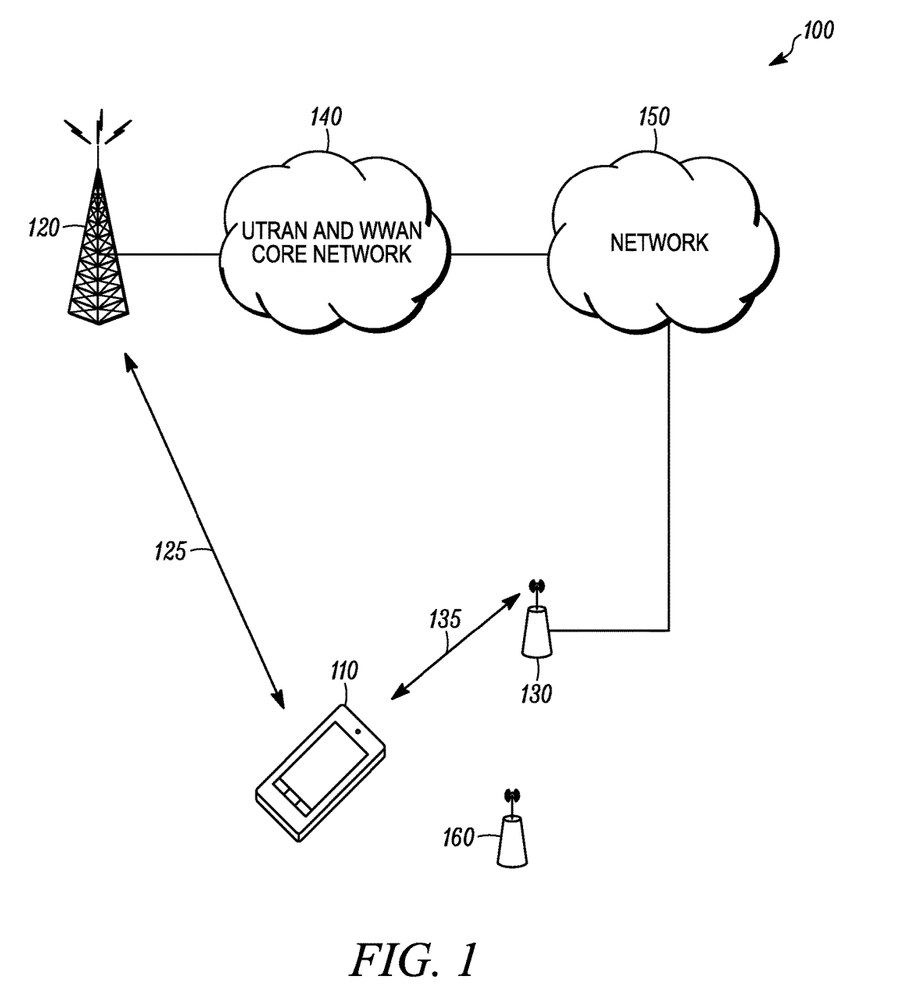
FIG. 1 is an example block diagram of a system according to a possible embodiment.

FIG. 1 is an example block diagram of a system 100 according to a possible embodiment. The system 100 can include a wireless communication device 110 a wireless wide area network base station 120 that uses a wireless wide area network radio access technology, a wireless local area network base station 130 that also uses the wireless wide area network radio access technology, a Universal Terrestrial Radio Access Network (UTRAN) and wireless wide area network core network 140, and a global network 150 that can include a plurality of networks. The wireless communication device 110 can be user equipment, a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network. The wireless local area network base station 130 that also uses the wireless wide area network radio access technology can also be considered a wireless wide communication network advanced access point, an LTE Advanced eNodeB, an LTE-U base station, or other base station or access point that operates on unlicensed frequencies, such as the 5 GHz spectrum, using a wireless wide area network radio access technology.

In operation, the device 110 can communicate with both the wireless wide area network base station 120 and the wireless local area network base station 130 using the same wireless wide area network radio access technology. For example, the device 110 can operate using an LTE Advanced radio access technology by communicating with the wireless wide area network base station 120 using a licensed band/frequency such as Long Term Evolution (LTE) band 4, and can communicate with the wireless local area network base station 130 using a 5 GHz unlicensed band/frequency, such as LTE band 255, for LTE Advanced communication. When communicating with both base stations 120 and 130, the device 110 can receive carrier aggregated data from both base stations 120 and 130. When communicating with the wireless local area network base station 130 using LTE band 255, the device 110 may not be connected to an 802.11 access point 160 to avoid signal interference because both radio access technologies can operate in the 5 GHz unlicensed band.

LTE Advanced radio access technologies can include LTE in Unlicensed spectrum (LTE-U), License Assisted Access (LAA), LTE-Wi-Fi Aggregation (LWA), MuLteFire, and other wireless wide area network advanced radio access technologies that provide for communication on both a wireless wide area network and a wireless local area network. These radio access technologies may require that the device 110 operates on a corresponding wireless local area network base station 130 using a clean channel.

Figure 2:
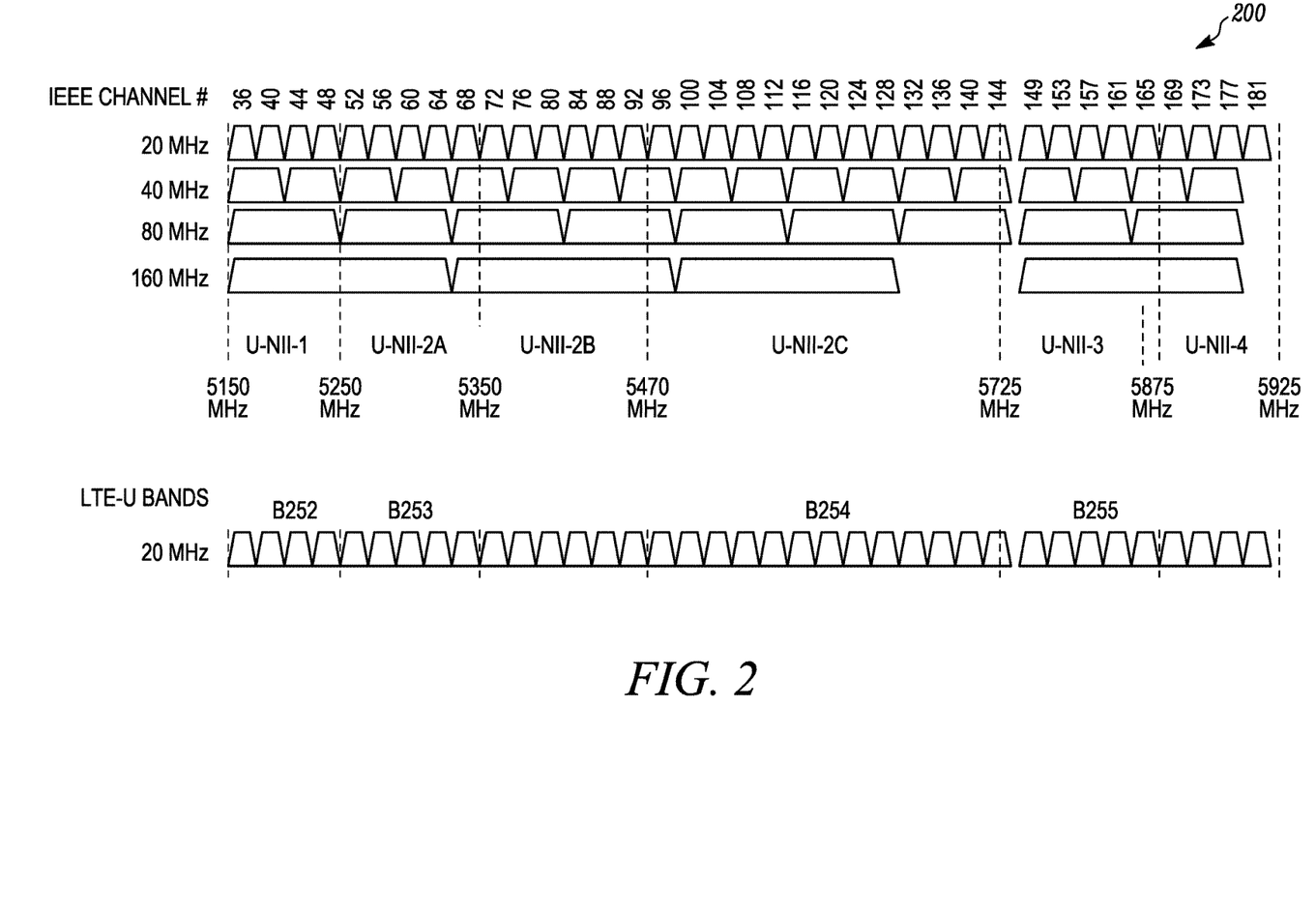
FIG. 2 is an example illustration of Unlicensed National Information Infrastructure bands according to a possible embodiment.

FIG. 2 is an example illustration of Unlicensed National Information Infrastructure (U-NII) bands U-NII-1 through U-NII-4 in the unlicensed 5 GHz spectrum 200 ranging from 5,150 MHz through 6,925 MHz according to a possible embodiment. Various IEEE 802.11 channels ranging from 36-181 can operate in the 5 GHz spectrum. These channels can be combined to have bandwidths of 20 MHz, 40 MHz, 80 MHz, and 160 MHz. LTE Advanced can also operate in the 5 GHz spectrum. For example, LTE-U bands B252, B253, B254, and B255 can operate in the 5 GHz spectrum and additional bands can be added. Initial deployments of LTE-U can support bands B252 and B255, while bands B253 and B254 can be in the Dynamic Frequency Selection (DFS) spectrum. Within each LTE-U band, there can be multiple 20 MHz wide channels that can be used.

Referring back to FIG. 1, a downlink in a communication signal 135 from the wireless local area network base station 130 operating in the 5 GHz spectrum in the system 100 can supplement a downlink in a communication signal 125 from the wireless wide area network base station 120 for carrier aggregation using different scenarios. Carrier Aggregation (CA) can be done to boost wireless wide area network data throughput under different wireless wide area network band combinations for supplemental downlink reception.

The LTE and LTE-U Operating bands for carrier aggregation can be with LTE bands B2/B4/B13 and LTE-U bands B252/B255. The other LTE bands may or may not be used for carrier aggregation. The LTE and LTE-U aggregation can be for 20 MHz wide channels, where initial deployments can be for scenarios 2, 4, and 6 in the table above.

For LTE Advanced, such as LTE-U, deployment methodology, factors including deployment layout, channel model, available spectrum, and other factors can be considered for coexistence performance between 802.11 and LTE-U systems, as well as between different LTE-U nodes, such as LTE-U base stations. For example, when LTE is simply deployed in unlicensed spectrum without any coexistence mechanism, LTE can cause performance degradation on coexisting neighbor 802.11 systems. Managing the coexistence of Wi-Fi and LTE-U can mitigate performance degradation for deployment of the LTE-U supported access points, such as wireless local area network base stations that use wireless wide area network radio access technology, in a wireless medium environment with 802.11. Methods to solve 802.11 and LTE-U coexistence can include Carrier Sense Adaptive Transmission (CSAT), channel selection, Opportunistic Supplemental Downlink (OSDL), and Listen Before Talk (LBT).

Figure 3:
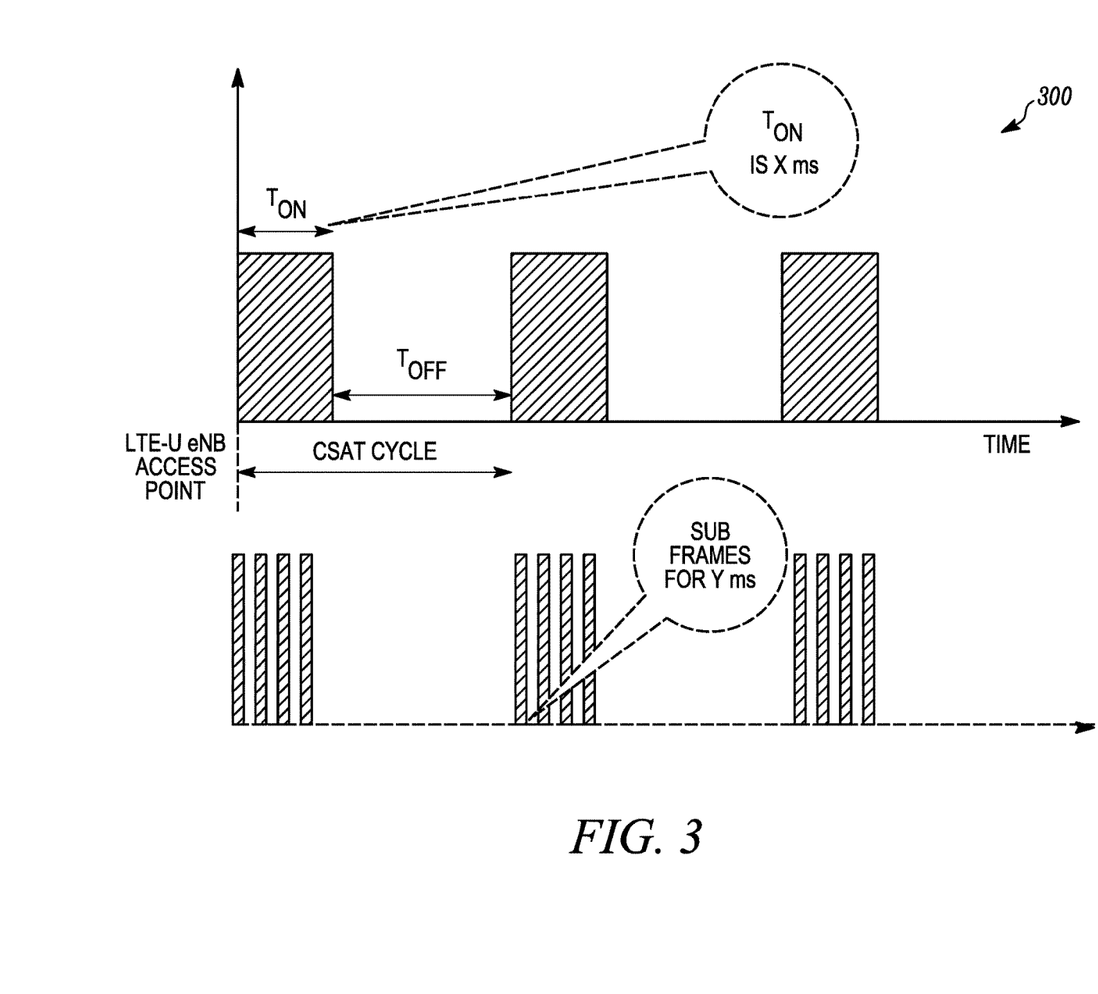
FIG. 3 is an example illustration of carrier sense adaptive transmission according to a possible embodiment.

FIG. 3 is an example illustration 300 of CSAT according to a possible embodiment. With CSAT, communication in unlicensed spectrum can be used to avoid and mitigate the interference between radio access technologies to use unlicensed 5 GHz spectrum for transmission, based on Time Division Multiplexing (TDM) communication patterns, which can be done periodically, where time slots up to 20-50 msec can be reserved for mobile operators, such as wireless wide area network operators. The CSAT cycle can be X ms apart, which can be repeated periodically. $T_{ON}$ can be the duration when a LTE base station can transmit the data to a wireless communication device for aggregation. $T_{OFF}$ can be the duration when the LTE base station may not transmit any data to device. For latency sensitive application such as Voice over Wi-Fi Calling (VoWFC) the $T_{ON}$ can be divided into sub frames for Y ms. X ms and Y ms can be configured by a mobile, such as LTE, operator and dynamically changed based on the interference and data load. The value of X and Y in the CSAT cycle can be dynamic and can be configured

TABLE 1

| | | | | |
|---|---|---|---|---|
| LTE-U supplemental downlink carrier aggregation scenarios | | | | |
| Band # Combination | Licensed Band | Unlicensed Band | BW (MHz) | CA Configuration |
| 1 B13 + B252 + B252<br>B13 + B255 + B255 | B13<br>B13 | U-NII-1<br>U-NII-3 | 10 + 20 + 20<br>10 + 20 + 20 | inter-band + unlicensed<br>intra-band contiguous DL CA<br>w/o UL CA |
| 2 B13 + B252<br>B13 + B255 | B13<br>B13 | U-NII-1<br>U-NII-3 | 10 + 20<br>10 + 20 | inter-band DL CA without UL CA |
| 3 B2 + B252 + B252<br>B2 + B255 + B255 | B2<br>B2 | U-NII-1<br>U-NII-3 | [5, 10, 15, 20] + 20 + 20<br>[5, 10, 15, 20] + 20 + 20 | inter-band + unlicensed<br>intra-band contiguous DL CA<br>w/o UL CA |
| 4 B2 + B252<br>B2 + B255 | B2<br>B2 | U-NII-1<br>U-NII-3 | [5, 10, 15, 20] + 20<br>[5, 10, 15, 20] + 20 | inter-band DL CA without UL CA |
| 5 B4 + B252 + B252<br>B4 + B255 + B255 | B4<br>B4 | U-NII-1<br>U-NII-3 | [5, 10, 15, 20] + 20 + 20<br>[5, 10, 15, 20] + 20 + 20 | inter-band + unlicensed<br>intra-band contiguous DL CA<br>w/o UL CA |
| 6 B4 + B252<br>B4 + B255 | B4<br>B4 | U-NII-1<br>U-NII-3 | [5, 10, 15, 20] + 20 | inter-band DL CA without UL CA | at run time by the operator, which may or may not bring down the whole throughput of the network.

For the channel selection solution for coexistence, the cleanest channel in general can be chosen where 802.11 primary channels can be avoided, channels occupied by other LTE-U operators can be avoided, and the channel occupied by the same LTE-U operator can be chosen. The channel selection can further be based on network operator decisions. For the OSDL solution for coexistence, data transmissions can be avoided if there is a small amount of traffic. For example, if the data activity for the LTE usage is below certain threshold, then the LTE-U CSAT cycle can be shut down and legacy behavior can be used.

CSAT polling can be of a fixed duration, while LBT can be dynamic. For example, in LBT, a radio transceiver can first sense, such as listen to, a channel before it starts a transmission. If a selected channel is busy, the radio transceiver can wait until the channel is free. If the channel is not busy, the radio transceiver can start the transmission.

Figure 4:
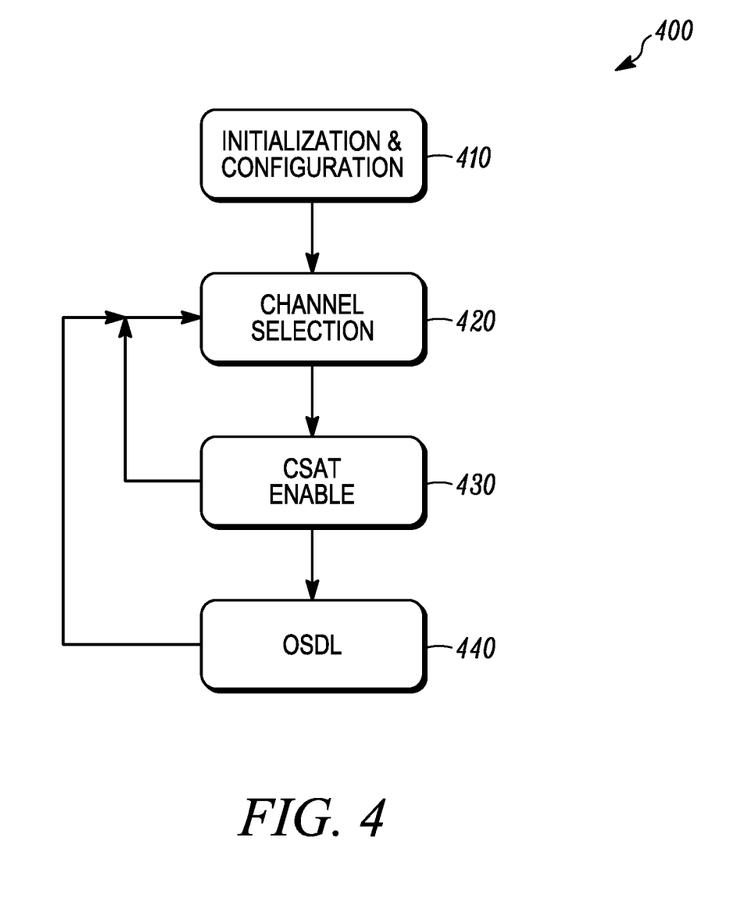
FIG. 4 is an example state diagram for LTE-U coexistence according to a possible embodiment.

FIG. 4 is an example state diagram 400 for LTE-U coexistence according to a possible embodiment. At 410, coexistence initiation and configuration can be administered by the mobile operator. At 420, channel selection can be performed. The channel selection algorithm can be specific to the vendor that provided the chip for the LTE-U access point/base station. At 430, then CSAT can be enabled and the CSAT duty cycle can be controlled based on the traffic and load on the network. At 440, OSDL can shut off the LTE-U completely when the system identifies the data quantity to be transmitted on LTE-U band is less.

Embodiments can provide for 5 GHz channel selection for a wireless local area network base station using wireless wide area network radio access technology for LTE Advanced systems, such as LTE-U, LAA, LWA, MuLteFire, and other systems that employ a wireless local area network base station using wireless wide area network radio access technology. Embodiments can allow all carriers to be up to date with information about the 5 GHz environment and its channel load. This can help the carriers change the base station channel in the 5 GHz spectrum to provide the least interference in the 5 GHz environment.

Figure 5:
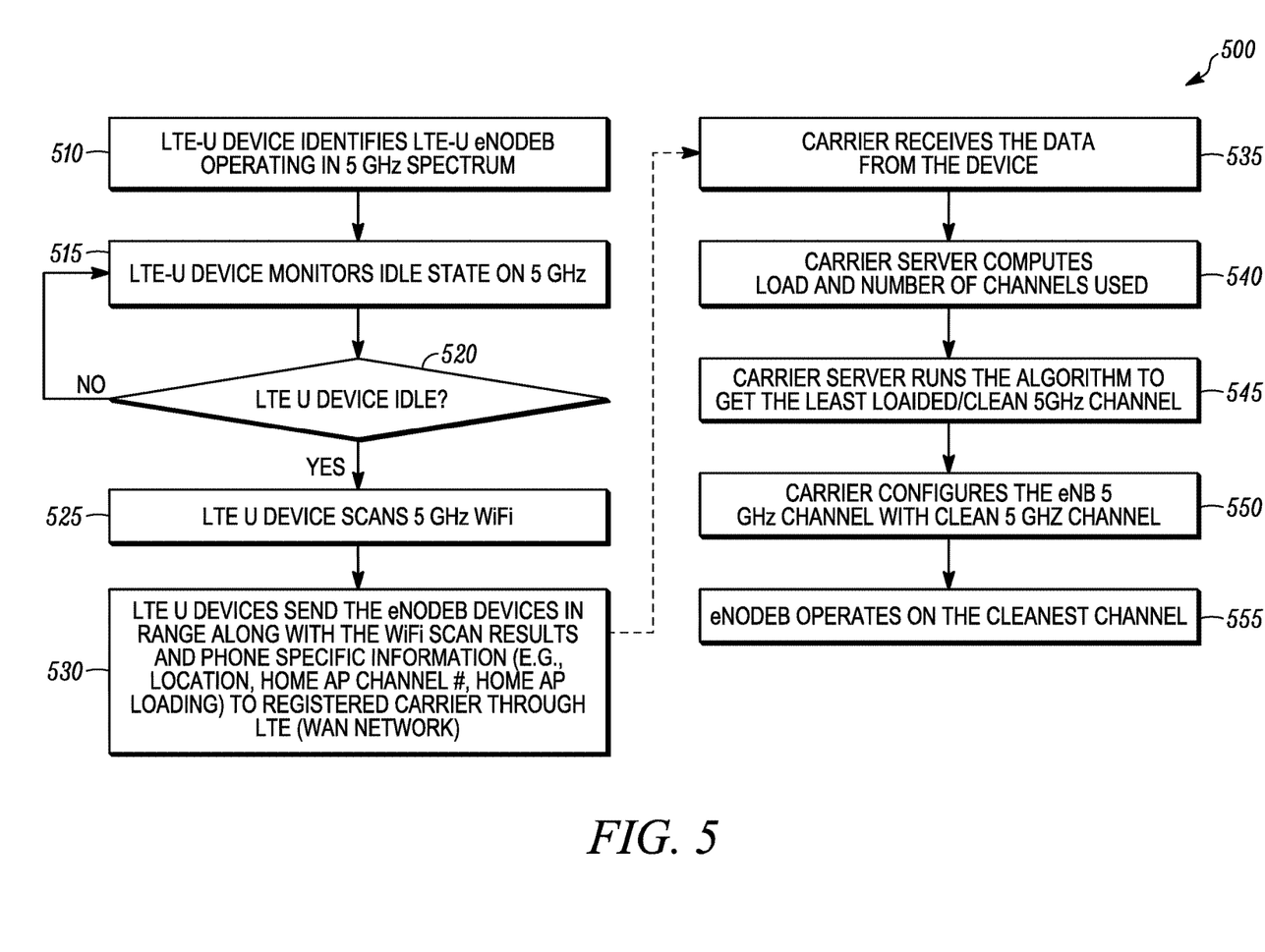
FIG. 5 is an example flowchart illustrating the operation of a wireless communication system according to a possible embodiment.

FIG. 5 is an example flowchart 500 illustrating the operation of a wireless communication system, such as the system 100, according to a possible embodiment. At 510, a LTE-U device, such as the device 110, can identify an LTE-U 5 GHz eNodeB operating in the 5 GHz spectrum, such as a wireless local area network base station using a wireless wide area network radio access technology. At 515, the LTE-U device can monitor its idle state on the 5 GHz spectrum. If at 520, the LTE-U device is idle on the 5 GHz spectrum, at 525, the LTE-U device can scan the 5 GHz spectrum, such as unlicensed frequencies used by 802.11 systems. At 530, the LTE-U device can send information about the eNodeB device in range along with the 5 GHz spectrum scan results and device specific information to its registered carrier, such as its mobile operator, through a wireless wide area network, such as LTE. The device specific information can include its location, its home access point channel number, its home access point loading, and other device specific information.

At 535, the carrier, such as a wireless wide area network operator, can receive the information from the LTE-U device. At 540, the carrier server can computer the load and number of channels used in the 5 GHz spectrum. At 545, the carrier server can run an algorithm to determine the least loaded, such as the cleanest, 5 GHz channel. The cleanest channel can be the channel with the least interference. For example, if there is interference on all channels the cleanest channel can be the channel with the lightest loading and least interference. If at least one channel is interference free with no loading, the cleanest channel can be a channel of the at least one channel that is interference free with no loading. At 550, the carrier can configure an LTE-U eNodeB 5 GHz channel with the cleanest 5 GHz channel. At 555, the LTE-U eNodeB can operate with the cleanest channel that is the least loaded.

According to a possible embodiment, the operating channel for the 5 GHz eNodeB can be set by the carrier. Since the 5 GHz eNodeB may not be an 802.11 access point, it may not perform the 5 GHz spectrum scan. Because the carrier can use data and information that can be used to compute the best channel and switch the 5 GHz eNodeB channel to best channel, a device can scan the 5 GHz spectrum and send the 5 GHz spectrum scan and metric information back to the carrier. The carrier can use the information to compute the cleanest channel and set the channel at the 5 GHz eNodeB. The carrier can also get this information from multiple devices in the same vicinity to set the cleanest channel that has the minimum interference among all the users for that particular 5 GHz eNodeB. For example, the device can relay 5 GHz eNodeB devices in range along with the WiFi scan results and relevant phone information back to the carrier server through LTE network, for carrier to get real time data of 5 GHz spectrum interference and the operating environment. The carrier infrastructure can capture all of the information for devices in proximity to each eNodeB. The carrier can then determine the cleanest LTE-U channel to be used by the eNodeB based on the available information.

Figure 6:
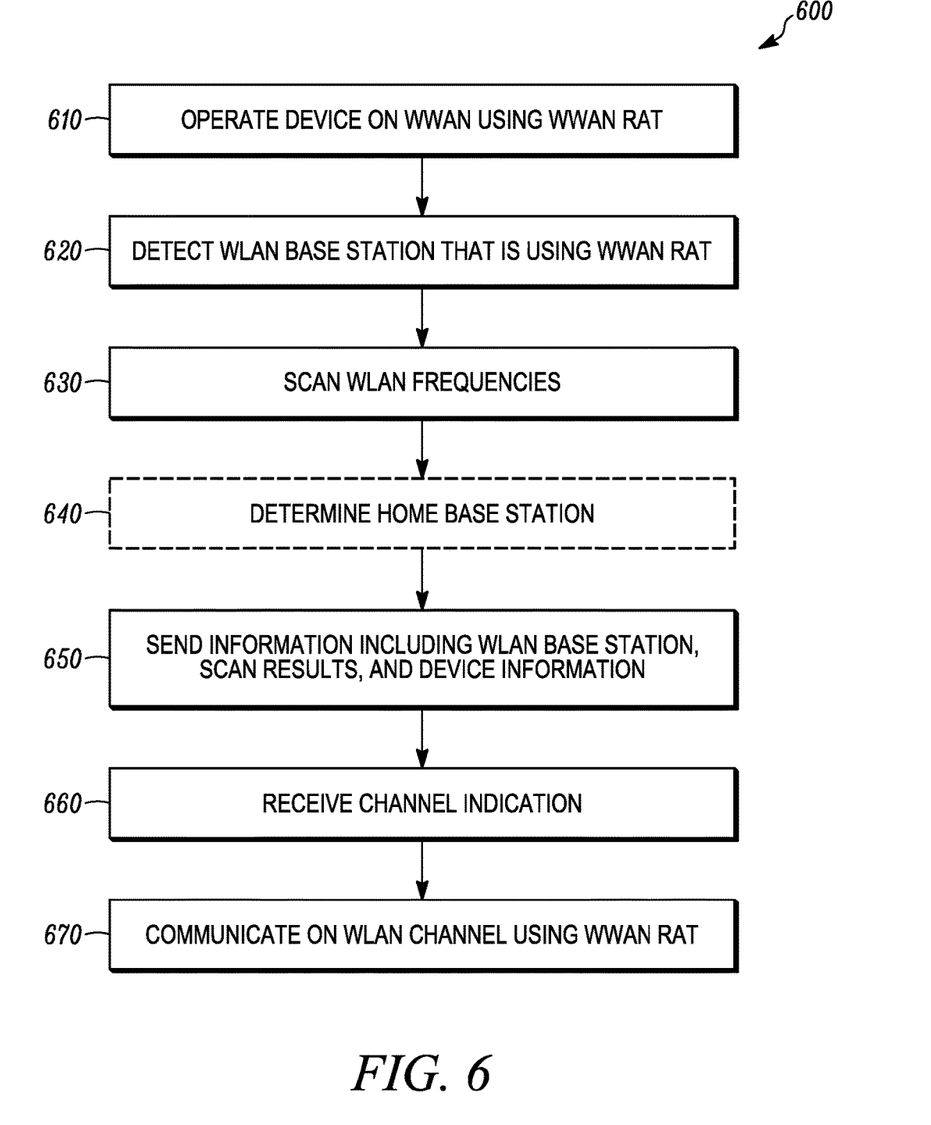
FIG. 6 is an example flowchart illustrating the operation of a wireless communication device according to a possible embodiment.

FIG. 6 is an example flowchart 600 illustrating the operation of a wireless communication device, such as the device 110, according to a possible embodiment. At 610, the device can operate on a wireless wide area network channel using a wireless wide area network base station using a wireless wide area network radio access technology. The wireless wide area network base station can be a cellular base station, a Long Term Evolution (LTE) base station, a licensed frequency base station, an eNodeB, and/or any other wireless wide area network base station using a corresponding wireless wide area network channel. The wireless wide area network radio access technology can be a LTE-based radio access technology, can be a cellular service radio access technology, can be an IEEE 802.16 radio access technology, or can be other wireless wide area network radio access technologies, such as radio access technologies common to a given wireless wide area network service provider.

At 620, at least one wireless local area network base station using the wireless wide area network radio access technology operating on a wireless local area network frequency can be detected. A wireless wide area network can be a long term evolution-based network and a wireless local area network can be a 5 GHz spectrum, such as an 802.11 frequency range, based network. The wireless local area network base station using the wireless wide area network radio access technology can be a wireless wide area network with a local area network range base station, a base station operating in a 5 GHz spectrum, a base station operating on an unlicensed frequency spectrum, a wireless access point, and/or any other wireless local area network base station using a wireless wide area network radio access technology and corresponding channel. For example, the wireless local area network base station using the wireless wide area network radio access technology and the wireless wide area network base station using the wireless wide area network radio access technology can be base stations of a same service provider.

For example, a single wireless wide area network radio access technology can use LTE radio access technology on a wireless wide area network base station using the wireless wide area network radio access technology and can use the same radio access technology in the form of LTE-Unlicensed (LTE-U), License Assisted Access (LAA), LTE WiFi Aggration (LWA), MuLteFire, or other LTE radio access technology to help boost LTE data throughput by augmenting the throughput with both unlicensed and licensed spectrum on the wireless local area network base station using the wireless wide area network radio access technology. Other radio access technologies can include 802.11 radio access technologies, 802.15 radio access technologies, and other radio access technologies. The wireless local area network frequency that the wireless wide area network radio access technology operates on can include a plurality of wireless local area network frequencies that overlap with wireless local area network frequencies of the 802.11 radio access technology. Thus, the wireless local area network base station using a given wireless wide area network radio access technology, such as LTE including LTE-U, LAA, LWA, and/or other local LTE radio access technology, is different from a wireless local area network base station that uses a local wireless local area network technology, such as 802.11.

At 630, wireless local area network frequencies can be scanned. The scanned wireless local area network frequencies can be frequencies for IEEE 802.11 channels 36-181 corresponding to LTE-U U-NII-1 through U-NII-4, as well as other similar frequencies in the 5 GHz spectrum. For example, the wireless local area network frequencies can be frequencies in a range of 4,915 MHz to 5,925 MHz. Scanning can include scanning for a base station beacon and/or probing for a response. A base station can typically transmit the beacon every 100 ms. When probing for a response, the device can send one probe request on a given channel and multiple base stations that are operating on that channel can then send a probe response. A beacon and/or a probe response can include wireless local area network information such as a Service Set Identifier (SSID) of a wireless local area network and/or corresponding base station, a Basic Service Set Identifier (BSSID), such as a Medium Access Control (MAC) address of an 802.11 chipset running on the base station, a channel of the base station, capabilities of the base station, and other information. At least some of this information can be sent as the results of scanning the wireless local area network frequencies. Information about the at least one wireless local area network base station can be determined based on scanning the wireless local area network frequencies and thus can be part of the results of scanning the wireless local area network frequencies.

Scanning the wireless local area network frequencies can also include determining whether the device is idle on the wireless local area network frequencies and scanning the wireless local area network frequencies when the device is idle on the wireless local area network frequencies. Otherwise, the device may not have enough time to scan the wireless local area network channel if it is already receiving/transmitting data on the wireless local area network frequencies, which can also affect channel loading.

At 640, a wireless local area network base station can be determined to be a home base station using the wireless wide area network radio access technology operating on a wireless local area network frequency by adding weighting to home base station decision where a base station with a higher probability of being a home base station can be given more weighting than other proximal base stations. For example, to know whether a base station is the home base station, such as a personal base station/access point, of the user of the device that the device frequently operations on, weighting can be added to decision making at the base station. A home base station can have more weighting than a public base station or vice versa, which can influence which base station is preferable both for base station operation and base station selection. Information used to determine whether a base station is a home base station can include device location, time of day when accessing the home base station, user designation of a base station/wireless local area network as a home base station, and other information. Information that a base station is the home base station can be sent with the other information.

At 650, information including information about the at least one wireless local area network base station using the wireless wide area network radio access technology, the results of scanning the wireless local area network frequencies, and device specific information can be sent to a base station. The device specific information can include a location of the device, a home base station, such as home access point, a channel number, and home base station load information. The home base station channel number can be the channel of the unlicensed channels that the device is communicating on/connected to. The home access point load information can include a number of base stations operating on each channel, such as based on the beacon and/or probe response on specific channels. The device specific information can also include other information specific to the device and its operational environment. The device specific information can additionally include information identifying which base station is the home base station/access point.

Sending the information can include sending the information to a remote wireless wide area network operator/controller and/or to a local controller, such as at a wireless local area network base station, either of which or both can make a decision of which wireless local area network channel the device can operate on. The base station that the information is sent to can be a wireless wide area network base station, can be a wireless local area network base station that may use the wireless wide area network radio access technology, a wireless local area network radio access technology, or other radio access technology, and/or can be any other useful base station.

At 660, an indication of the channel of the wireless local area network frequencies for communicating can be received, such as from a network operator. The indication can be received on the wireless local area network using the wireless wide area network radio access technology, the wireless wide area network, or any other channel on any other network system.

At 670, a wireless local area network channel of the wireless local area network frequencies can be communicated on with a wireless local area network base station of the at least one wireless local area network base station using the wireless wide area network radio access technology in response to sending the information. Communicating can include receiving carrier aggregated data on a combination of a channel on the wireless wide area network and the channel of the wireless wide area network radio access technology operating on a wireless local area network. Information can also just be communicated on one or the other of the wireless local area network using the radio access technology and wireless wide area network channels/base stations. According to a possible implementation, the device can send the information to the wireless wide area network base station, the cleanest channel can be selected by the wireless wide area network, the device can receive information about the selected cleanest channel from the wireless wide area network base station, and the device can communicate on the selected channel of the wireless local area network frequencies.

Figure 7:
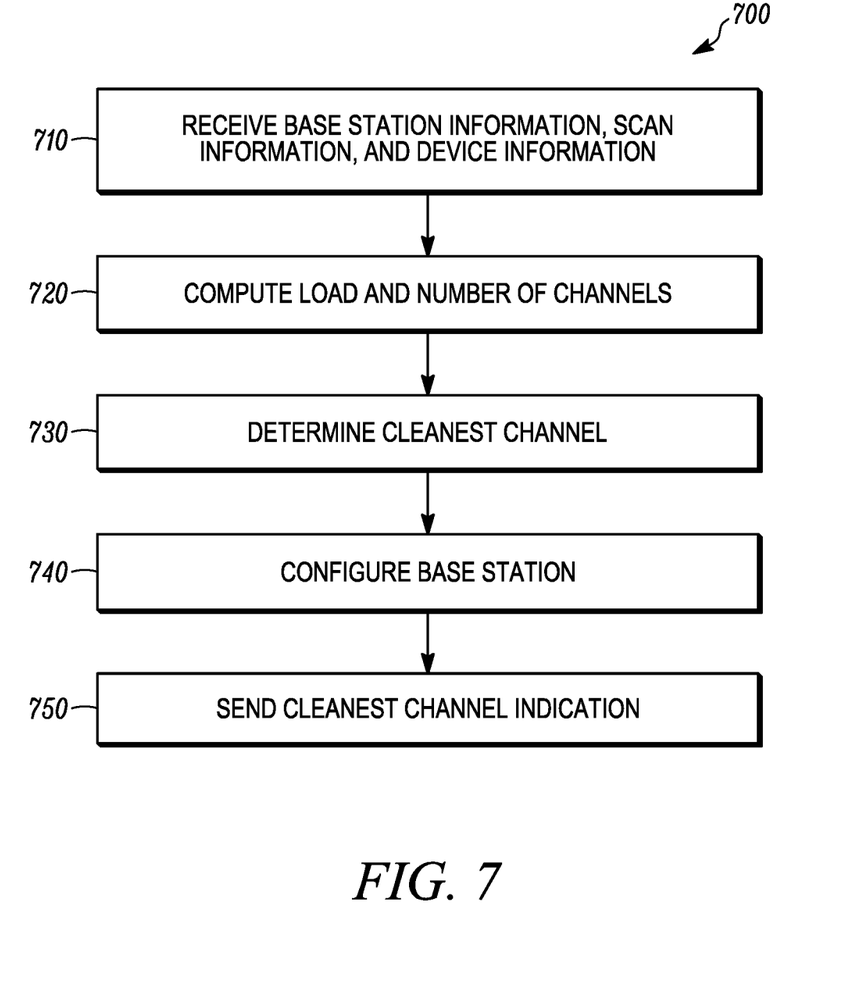
FIG. 7 is an example flowchart illustrating the operation of a communication device according to a possible embodiment.

FIG. 7 is an example flowchart 700 illustrating the operation of a communication device, such as the device 110, the base station 120, the access point 130, a controller and/or operator on the wireless wide area network core network 140, or any other device that can determine a cleanest channel with a smallest load according to a possible embodiment. At 710, information can be received from a device. The information can include at least one base station operating on a wireless local area network frequency using a wireless wide area network radio access technology, results of scanning wireless local area network frequencies, and device specific information. The information can be received at a wireless wide area network operator, at a wireless wide area network controller, at a base station, or at any other entity that can determine a cleanest channel with a smallest load. The information can be received from one or a plurality of devices in wireless communication proximity to the at least one base station.

At 720, a load on wireless local area network frequencies and a number of channels used on the wireless local area network frequencies can be computed based on the information received from the device. At 730, a cleanest channel with a smallest load can be determined based on computing the load on wireless local area network frequencies and the number of channels used on the wireless local area network frequencies. The cleanest channel with the smallest load can also be determined based on channel bandwidth, based on a modulation, such as a Modulation and Coding Scheme (MCS), rate of a given device on a given channel, and/or based on other information.

According to a possible embodiment, when there is an environment with several access points and devices operating in the same frequency range, there can be increased channel congestion which can result in high latency and lower throughput in systems operating on a crowded channel Hence the channel that has the least interference can be identified and intelligently selected. An algorithm can be applied to compute best channel based on a Received Signal Strength Indicator (RSSI) that is acquired as part of the scanning done by the device. The device can scan for all the access points that are in its vicinity. While in the process of scanning, an array list of the access points available on the particular channel can be prepared. Each access point can have an RSSI value. The range of RSSI values typically can be in the −30 dBm to −100 dBm range. Based on the scan results, an array list for the scanned access points can be prepared for the access points that have a RSSI value less than −75 dBm. The array list can now contain the access points with the weakest signal strength. Limiting the array list to access points less than −75 dBm can help reduce complexity in computing channel loading. One preference can be to pick the 5 GHz channel that has the least interference with no access points beaconing on it. Another preference can also account for HT40 channel bonding channels meaning the channel in the 5 GHz range can be picked that is least likely to have HT40+/HT40− bonding channel.

If all of the channels have interference, then the load of each channel can be computed by dividing the number of Access Points (APs) beaconing on the specific channel. The formula for computing the channel load (CHLx) on each channel of N channels can be $$CHLx=((RSSI+200)AP1+(RSSI+200)AP2+ \ldots +(RSSI+200)APn)/N.$$

Once each channel load is computed, each channel load can be arranged in an ascending order load channel array. The load channel array can be traversed and the following algorithm can be applied for each value of the array list to compute the Channel Load Efficiency (CLE):

$$CLE=N*(CHLx).$$

Once CLE is computed, then the values can be re-arranged in ascending order. The best, such as cleanest, candidate channel can be the channel that has the smallest value. Before asserting the candidate channel as the best channel, HT40−/HT40+ consideration can take place for the 5 GHz channel. For example, if successive load channel efficiency is the secondary channel for HT40+/HT40− the channel can be selected as the best/cleanest channel. If it is not, the next channel can be considered. This algorithm can be performed as soon as a scan is initiated by the device.

At 740, a base station of the at least one base station operating on the wireless local area network frequency using the wireless wide area network radio access technology can be configured to operate on the cleanest channel using the wireless wide area network radio access technology. At 750, an indication of the cleanest channel can be sent to the device. For example, the indication can indicate the cleanest channel by providing information about which channel a device should communicate on.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 8:
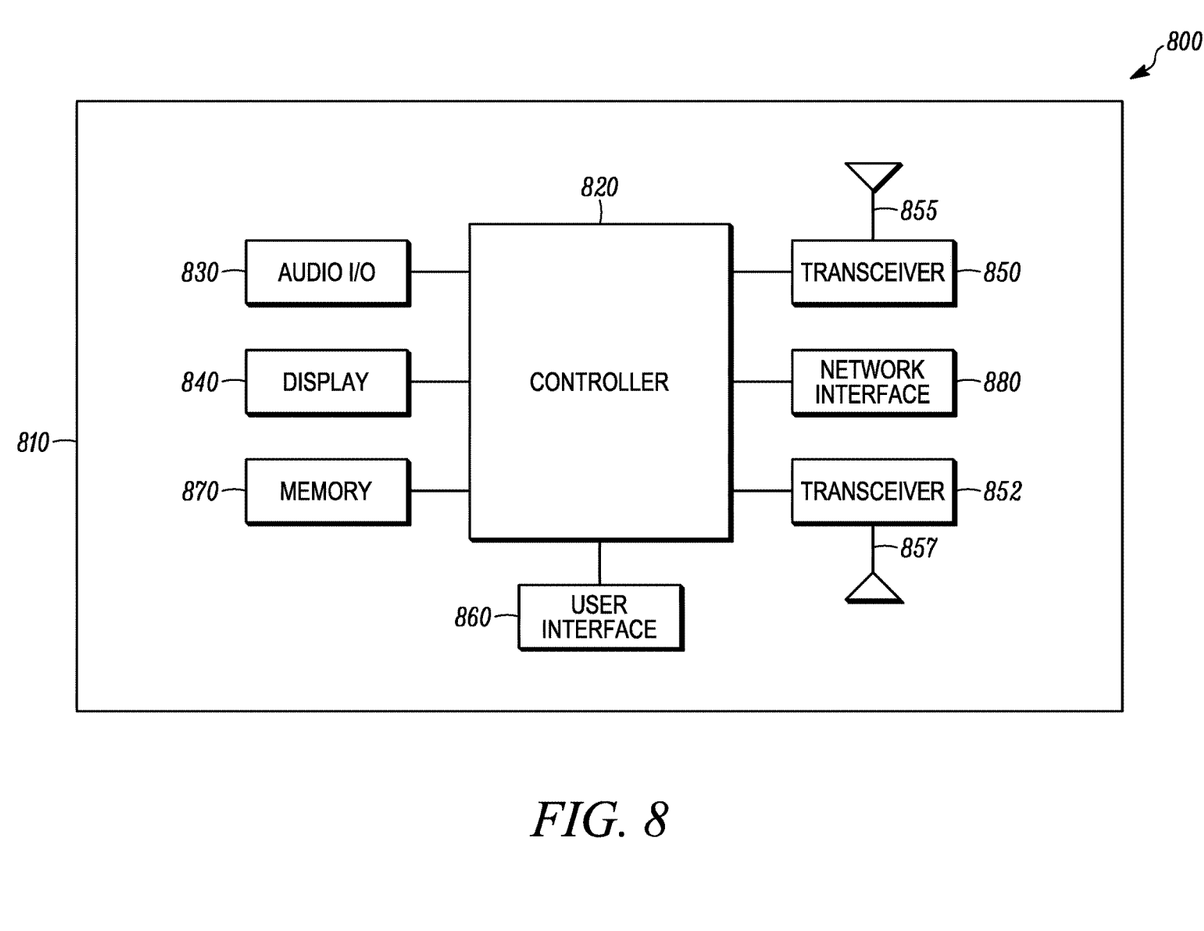
FIG. 8 is an example block diagram of an apparatus according to a possible embodiment.

FIG. 8 is an example block diagram of an apparatus 800, such as the wireless communication device 110, the base station 120, the access point 130, a network controller, or another communication device, according to a possible embodiment. The apparatus 800 can include a housing 810, a controller 820 within the housing 810, audio input and output circuitry 830 coupled to the controller 820, a display 840 coupled to the controller 820, a first transceiver 850 coupled to the controller 820, an antenna 855 coupled to the first transceiver 850, a second transceiver 852 coupled to the controller 820, an antenna 857 coupled to the second transceiver 852, a user interface 860 coupled to the controller 820, a memory 870 coupled to the controller 820, and a network interface 880 coupled to the controller 820. The apparatus 800 can perform the methods described in all the embodiments.

The display 840 can be a viewfinder, a liquid crystal display (LCD), a light emitting diode (LED) display, a plasma display, a projection display, a touch screen, or any other device that displays information. The first and second transceivers 850 and 852 can each include a transmitter and/or a receiver. The audio input and output circuitry 830 can include a microphone, a speaker, a transducer, or any other audio input and output circuitry. The user interface 860 can include a keypad, a keyboard, buttons, a touch pad, a joystick, a touch screen display, another additional display, or any other device useful for providing an interface between a user and an electronic device. The network interface 880 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 870 can include a random access memory, a read only memory, an optical memory, a flash memory, a removable memory, a hard drive, a cache, or any other memory that can be coupled to an apparatus.

The apparatus 800 or the controller 820 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 870 or elsewhere on the apparatus 800. The apparatus 800 or the controller 820 may also use hardware to implement disclosed operations. For example, the controller 820 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 820 may be any controller or processor device or devices capable of operating an apparatus and implementing the disclosed embodiments.

In operation, the first transceiver 850 can operate the apparatus 800 on a wireless wide area network channel using a wireless wide area network base station using a wireless wide area network radio access technology. The second transceiver 852 can detect at least one wireless local area network base station using the wireless wide area network radio access technology operating on a wireless local area network frequency. The wireless local area network base station using the wireless wide area network radio access technology and the wireless wide area network base station using the wireless wide area network radio access technology can be base stations of a same service provider/operator.

The controller 820 can scan wireless local area network frequencies via the second transceiver 852 and send information to a base station. Before scanning, the controller 820 can determine whether the apparatus 800 is idle on the wireless local area network frequencies and scans wireless local area network frequencies when the device is idle on the wireless local area network frequencies. The controller 820 can determine the apparatus 800 is idle on the wireless local area network frequencies by determining the second transceiver 820 and/or another wireless local area network transceiver on the apparatus 800 is idle on the wireless local area network frequencies. The wireless local area network frequencies can include frequencies in the 5 GHz spectrum, such as in a range of 4,915 MHz to 5,925 MHz. The controller 820 can send the information via the first transceiver 850 or the second transceiver 852. The information can include information about the at least one wireless local area network base station using the wireless wide area network radio access technology, the results of scanning the wireless local area network frequencies, and apparatus specific information. The apparatus specific information can include a location of the apparatus 800, a home base station channel number, and home base station load information. The controller 820 can determine a wireless local area network base station using the wireless wide area network radio access technology is the home base station by adding weighting to home base station decision making where a base station with a higher probability of being a home base station is given more weighting than other proximal base stations.

The controller 820 can receive an indication of the channel of the wireless local area network frequencies from a network operator for communicating with the wireless local area network base station using the wireless wide area network radio access technology. For example, the controller 820 can receive the indication via the first transceiver 850 or the second transceiver 852. The second transceiver 852 can communicate on the channel of the wireless local area network frequencies with a wireless local area network base station of the at least one wireless local area network base station using the wireless wide area network radio access technology in response to sending the information. The first and second transceivers 850 and 852 can communicate by receiving carrier aggregated data on a combination of a channel on the wireless wide area network via the first transceiver and the channel of the wireless local area network via the second transceiver.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method comprising:
   operating a device on a wireless wide area network channel using a wireless wide area network base station using a wireless wide area network radio access technology;
   detecting at least one wireless local area network base station using the wireless wide area network radio access technology operating on a wireless local area network frequency;
   scanning wireless local area network frequencies;
   sending information including information about the at least one wireless local area network base station using the wireless wide area network radio access technology, the results of scanning the wireless local area network frequencies, and device specific information to a base station; and
   communicating on a wireless local area network channel of the wireless local area network frequencies with a wireless local area network base station of the at least one wireless local area network base station using the wireless wide area network radio access technology in response to sending the information.

2. The method according to claim 1, wherein the device specific information includes a location of the device, a home base station channel number, and home base station load information.

3. The method according to claim 2, further comprising determining a wireless local area network base station is the home base station using the wireless wide area network radio access technology operating on a wireless local area network frequency by adding weighting to home base station decision making where a base station with a higher probability of being a home base station is given more weighting than other proximal base stations.

4. The method according to claim 1, wherein communicating comprises receiving carrier aggregated data on a combination of a channel on the wireless wide area network and the channel of the wireless wide area network radio access technology operating on a wireless local area network.

5. The method according to claim 1, wherein scanning the wireless local area network frequencies includes determining whether the device is idle on the wireless local area network frequencies and scanning the wireless local area network frequencies when the device is idle on the wireless local area network frequencies.

6. The method according to claim 1, wherein the wireless wide area network comprises a long term evolution-based network and the wireless local area network comprises an 802.11 frequency range network.

7. The method according to claim 1, further comprising receiving an indication of the channel of the wireless local area network frequencies for communicating from a network operator.

8. The method according to claim 1, wherein the wireless local area network frequencies comprise frequencies in a range of 4,915 MHz to 5,925 MHz.

9. The method according to claim 1, wherein the wireless local area network base station using the wireless wide area network radio access technology and the wireless wide area network base station using the wireless wide area network radio access technology are base stations of a same service provider.

10. The method according to claim 1, wherein communicating comprises communicating, using the wireless wide area network radio access technology, on a wireless local area network channel of the wireless local area network frequencies with a wireless local area network base station of the at least one wireless local area network base station using the wireless wide area network radio access technology in response to sending the information.

11. The method according to claim 1, wherein the wireless local area network base station uses the wireless wide area network radio access technology for communication on the wireless local area network frequency.

12. An apparatus comprising:
    a first transceiver to operate the apparatus on a wireless wide area network channel using a wireless wide area network base station using a wireless wide area network radio access technology;
    a second transceiver to detect at least one wireless local area network base station using the wireless wide area network radio access technology operating on a wireless local area network frequency; and
    a controller to scan wireless local area network frequencies via the second transceiver and send information including information about the at least one wireless local area network base station using the wireless wide area network radio access technology, the results of scanning the wireless local area network frequencies, and apparatus specific information to a base station,
    wherein the second transceiver communicates on a channel of the wireless local area network frequencies with a wireless local area network base station of the at least one wireless local area network base station using the wireless wide area network radio access technology in response to sending the information.

13. The apparatus according to claim 12, wherein the apparatus specific information includes a location of the apparatus, a home base station channel number, and home base station load information.

14. The apparatus according to claim 13, wherein the controller determines a wireless local area network base station using the wireless wide area network radio access technology is the home base station by adding weighting to home base station decision making where a base station with a higher probability of being a home base station is given more weighting than other proximal base stations.

15. The apparatus according to claim 12, wherein the first and second transceiver communicate by receiving carrier aggregated data on a combination of a channel on the wireless wide area network via the first transceiver and the channel of the wireless local area network via the second transceiver.

16. The apparatus according to claim 12, wherein the controller determines whether the apparatus is idle on the wireless local area network frequencies and scans wireless local area network frequencies when the apparatus is idle on the wireless local area network frequencies.

17. The apparatus according to claim 12, wherein the controller receives an indication of the channel of the wireless local area network frequencies from a network operator for the communicating.

18. The apparatus according to claim 12, wherein the wireless local area network frequencies comprise frequencies in a range of 4,915 MHz to 5,925 MHz.

19. The apparatus according to claim 12, wherein the wireless local area network base station using the wireless wide area network radio access technology and the wireless wide area network base station using the wireless wide area network radio access technology are base stations of a same service provider.

* * * * *